US009199361B2

(12) United States Patent
Taylor

(10) Patent No.: US 9,199,361 B2
(45) Date of Patent: Dec. 1, 2015

(54) FASTENING DEVICE AND METHOD OF USE THEREOF

(71) Applicant: Honda Motor Co., Ltd., Tokyo (JP)

(72) Inventor: Steve Taylor, Midhurst (CA)

(73) Assignee: HONDA MOTOR CO., LTD., Tokyo (JP)

( * ) Notice: Subject to any disclaimer, the term of this patent is extended or adjusted under 35 U.S.C. 154(b) by 285 days.

(21) Appl. No.: 13/705,740

(22) Filed: Dec. 5, 2012

(65) Prior Publication Data
US 2013/0139651 A1 Jun. 6, 2013

(30) Foreign Application Priority Data

Dec. 6, 2011 (CA) ...................................... 2761521

(51) Int. Cl.
| B25B 21/00 | (2006.01) |
| B25B 23/00 | (2006.01) |
| B25B 13/48 | (2006.01) |
| B25B 17/00 | (2006.01) |
| B23P 19/06 | (2006.01) |

(52) U.S. Cl.
CPC ................. B25B 21/00 (2013.01); B23P 19/06 (2013.01); B25B 13/48 (2013.01); B25B 17/00 (2013.01); B25B 23/0007 (2013.01)

(58) Field of Classification Search
CPC ...... B25B 17/00; B25B 13/48; B25B 13/481; B25B 23/0007; B25B 23/0078; B25B 23/0085; B25B 21/00; B25B 21/002; B23P 19/06
USPC .............. 81/57.22, 57.3, 57.31, 57.14, 13, 56
See application file for complete search history.

(56) References Cited

U.S. PATENT DOCUMENTS

| 1,327,991 | A | * | 1/1920 | Gatewood ...................... 81/57.3 |
| 1,431,832 | A | * | 10/1922 | Mills et al. ........................ 81/13 |
| 1,795,150 | A | * | 3/1931 | Slazes .......................... 81/57.22 |
| 2,482,387 | A | | 9/1949 | Veneman |
| 2,556,536 | A | | 6/1951 | Harris |
| 3,535,960 | A | | 10/1970 | Borries |
| 3,783,955 | A | | 1/1974 | Gill |
| 4,171,651 | A | | 10/1979 | Dacunto |
| 4,674,366 | A | | 6/1987 | Lauer et al. |
| 4,679,327 | A | | 7/1987 | Fouchey et al. |
| 4,928,558 | A | | 5/1990 | Makhlouf |
| 4,942,794 | A | | 7/1990 | Snyder et al. |

(Continued)

FOREIGN PATENT DOCUMENTS

| DE | 3718087 | 12/1987 |
| JP | 2004-351603 | 5/2003 |

OTHER PUBLICATIONS

Johannes Lubbering GmbH, Schraubtechnik-Katalog, V09.001 online version, Herzebrock-Clarholz Germany.

*Primary Examiner* — Hadi Shakeri
(74) *Attorney, Agent, or Firm* — Standley Law Group LLP

(57) ABSTRACT

Disclosed herein are different embodiments of a fastening device. In particular, various embodiments of a fastening device are described herein for enabling fasteners of different types (e.g. shape and/or size, etc.) to be fastened using a common input drive. For example, different embodiments of the herein described fastening device comprise two or more output sockets in attending to the fastening of different fastener types, which output sockets are selectable in one example by reorienting the fastening device via activation of the input drive.

18 Claims, 7 Drawing Sheets

(56) References Cited

U.S. PATENT DOCUMENTS

| | | |
|---|---|---|
| 5,040,303 A | 8/1991 | Koerner |
| 5,277,085 A * | 1/1994 | Tanimura et al. ............ 81/57.22 |
| 5,460,062 A * | 10/1995 | Wilson, Jr. .................... 81/57.3 |
| 6,308,593 B1 | 10/2001 | Shibayama et al. |
| 7,062,992 B2 | 6/2006 | Spirer |
| 7,089,827 B2 | 8/2006 | Wexler |
| 7,357,053 B2 | 4/2008 | Doan |
| 7,703,356 B2 * | 4/2010 | Bass .............................. 81/57.3 |
| 2006/0108131 A1 | 5/2006 | Osada et al. |
| 2009/0100972 A1 | 4/2009 | Hoenke |
| 2009/0260488 A1 | 10/2009 | Kanazawa et al. |

* cited by examiner

FASTENING DEVICE AND METHOD OF USE THEREOF

CROSS-REFERENCE TO RELATED APPLICATIONS

This application is entitled to benefit of a right of priority under 35 USC §119 from Canadian patent application 2,761,521, filed Dec. 6, 2011, which is incorporated by reference as if fully recited herein.

TECHNICAL FIELD

The present disclosure relates generally to tools, and, in particular, to a fastening device, and method of use thereof.

BACKGROUND

Fastening tools are generally known in the art. Often these tools are specific to one type of fastener such that multiple devices are required to fasten different types (i.e., sizes and shapes) of fasteners. Alternatively, some tools have components designed to be removed and exchanged in order to reconfigure the tool in accommodating different sizes and/or shapes, such as, for example, those described in U.S. Pat. No. 7,089,827 to Wexler and U.S. Pat. No. 4,171,651 to Dacunto.

Other devices allow for the manual reconfiguration of the tool to select one of two available outputs, such as that described in U.S. Pat. No. 7,062,992 to Spirer, or again to provide access to different work implements, such as that described in U.S. Pat. No. 3,783,955 to Gill.

Similarly, U.S. Pat. No. 2,482,387 to Veneman describes a tool comprised of oppositely rotatable sockets allowing for the same tool to be shifted in selectively tightening and reversing a nut on a bolt, whereas U.S. Pat. No. 4,942,794 to Snyder et al. describes a torqueing tool adapted to tighten threaded connections to precise torque values, wherein a pair of output gears are mounted on a pair of spaced nuts and wherein a selected one of the nuts is tightened by utilizing the non-selected nut as a reaction element.

The above and other such fastening devices have several drawbacks, which will be readily apparent to the person of ordinary skill in the art, be it with respect to the limited interoperability of these tools for different applications, with other tools and/or with different types of fasteners, with respect to the limited adaptability of such tools for full or partial automation (e.g. automated manufacturing cycles, etc.), and/or with respect to other tool usage considerations readily understood in the art, to name a few.

Accordingly, the need remains for a fastening device that overcomes some of these drawbacks, or at least, provides the public with a useful alternative.

This background information is provided to reveal information believed by the applicant to be of possible relevance to the present invention. No admission is necessarily intended, nor should be construed, that any of the preceding information constitutes prior art against the present invention.

SUMMARY

Fastening devices according to the invention and methods of use thereof, overcome some of the drawbacks of known devices or, at least, provide useful alternatives.

In accordance with one exemplary embodiment of the invention, there is provided an apparatus for use with an input drive in fastening threaded fasteners of different types, comprising: an input hub for operative engagement with the input drive; two or more fastening arms extending radially from said input hub, each one of which includes a fastening output socket rotatably mounted at a distance from said input hub for cooperative engagement with threaded fasteners of a respective type, and a drive mechanism for operatively coupling said fastening output socket to said input drive via said input hub; wherein, upon engagement with said input hub, activation of said input drive reorients the apparatus; and a blocking mechanism configured to block the apparatus in a selected orientation for operating a selected one said fastening output socket.

In accordance with another exemplary embodiment of the invention, there is provided a geared offset head for use with an input drive in fastening threaded fasteners of different types, comprising: a body defining an input hub and two or more offset heads extending therefrom; an input gear operatively mounted at said hub for operative engagement with the input drive; a respective output socket operatively mounted at each of said two or more offset heads; a drive mechanism operatively coupling each said respective output socket to said input gear; and one or more structural features for blocking reorientation of the geared offset head during operation of a selected one of said offset heads; wherein, upon engagement with said input gear, activation of said input drive reorients the apparatus until engagement of said one or more structural features, thereby allowing operation of a selected output socket.

In accordance with another exemplary embodiment of the invention, there is provided a method for fastening fasteners of different types using a common input drive, comprising the steps of: coupling the input drive to a fastening device having two or more radially extending fastening arms, each one of which comprising an output socket and a driving mechanism operatively coupling each said output socket to the input drive; orienting the fastening device via activation of the input drive to align a selected one of said output sockets for operation in fastening a corresponding fastener type; and driving said selected output socket via said input drive to fasten said corresponding fastener type.

Other features of the invention will become more apparent upon reading of the following non-restrictive description of specific embodiments thereof, given by way of example only with reference to the accompanying drawings.

BRIEF DESCRIPTION OF THE DRAWINGS

Several embodiments of the present disclosure will be provided, by way of examples only, with reference to the appended drawings, wherein.

DETAILED DESCRIPTION OF EXEMPLARY EMBODIMENTS

Figure 1:
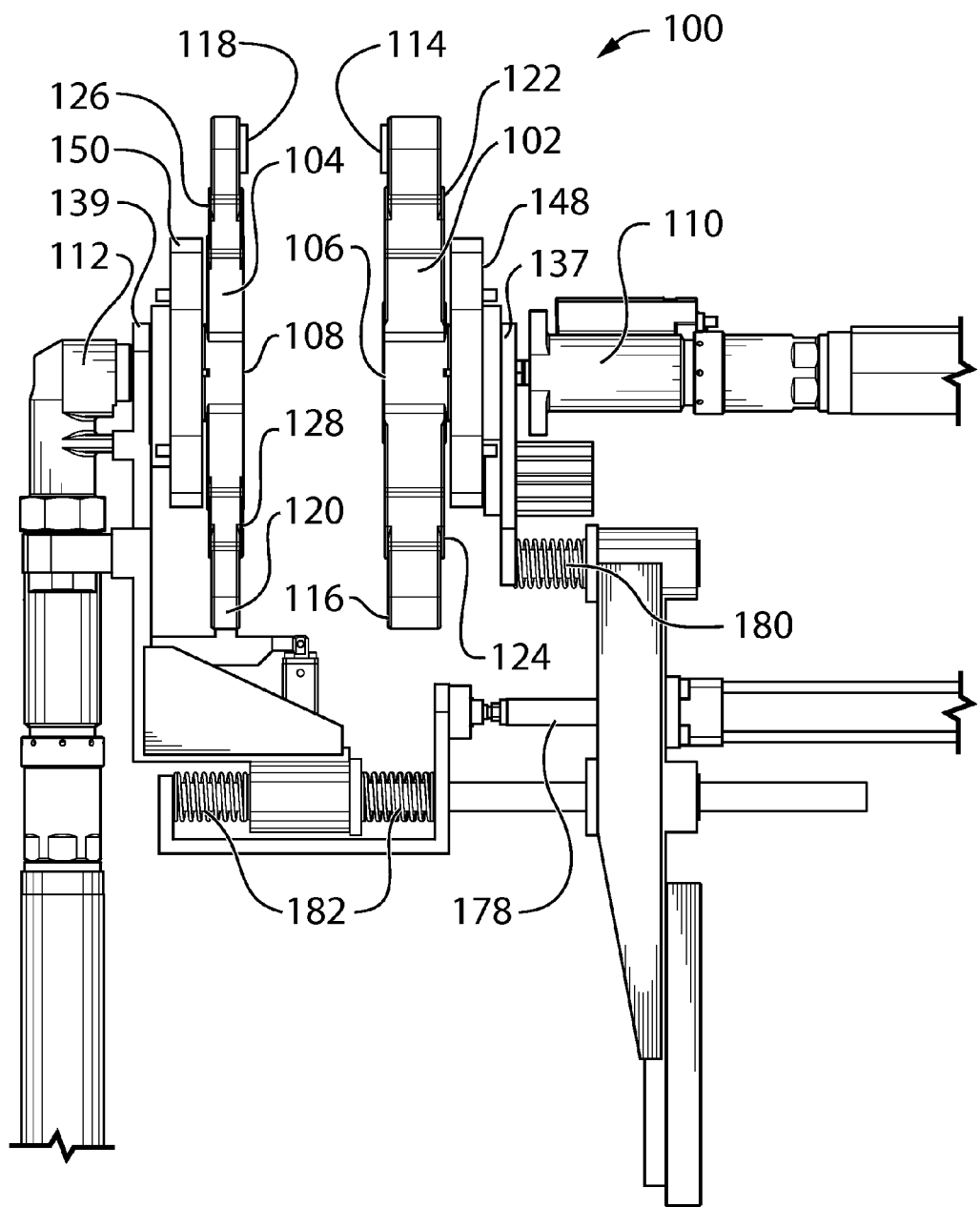
FIG. 1 is a front elevation view of a fastening device having a dual offset tightening head and a dual offset adjuster head, in accordance with one embodiment of the invention.

It should be understood that the disclosure is not limited in its application to the details of construction and the arrangement of components set forth in the following description or illustrated in the drawings. The disclosure is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical or electrical connections or couplings. Furthermore, and as described in subsequent paragraphs, the specific mechanical or electrical configurations illustrated in the drawings are intended to exemplify embodiments of the disclosure. However, other alternative mechanical or electrical configurations are possible which are considered to be within the teachings of the instant disclosure. Furthermore, unless otherwise indicated, the term "or" is to be considered inclusive.

With reference to the disclosure herein and the appended figures, a fastening device, and the various components and a method of use thereof will now be described, in accordance with different embodiments of the invention. In particular, various embodiments of a fastening device are described herein for enabling fasteners of different types (e.g. shape and/or size, etc.) to be fastened using a common input drive. For example, whereas previous techniques required the provision of distinct fastening devices for distinct fastener types, different embodiments of the herein described fastening device comprise two or more output sockets in attending to the fastening of different fastener types, which output sockets are selectable in one example by reorienting the fastening device via activation of the input drive.

It will be appreciated by the skilled artisan that the use herein of the terms "fasten", "fastening" and "fastener" are intended to be construed broadly to encompass various types of generally threaded fasteners, and actions imparted thereon and/or in relation thereto in tightening, adjusting, securing and/or otherwise attaching, mounting, fitting or coupling such fasteners, be it in the assembly or manufacture of a device, apparatus or machine, or other such applications as will be readily understood in the art. Clearly, the loosening and/or removal of such fasteners (i.e. unfastening) can also be considered within the present context without departing from the general scope and nature of the present disclosure. Furthermore, it will be appreciated that while the following description of illustrative embodiments provides predominantly for the fastening of differently sized hex-type and/or hex-compatible fasteners such as hex bolts and nuts, other fastener types having different head shapes (e.g. square, pentagon, etc.) as well as other fasteners defining respective drive sockets and thus requiring different fastener tooling heads (e.g. flat/slot, square/Robertson, cross/Phillips, hex, hexalobular/torx, etc.) may also be considered herein without departing from the general scope and nature of the present disclosure.

With reference to FIG. 1, a fastening device, generally referred to using the numeral 100, will now be described in accordance with one embodiment of the invention. The fastening device 100 generally comprises a dual offset tightening head 102 and a dual offset adjuster head 104, each one of which comprising an input hub 106, 108 operatively coupled to a respective input drive 110, 112, and two diametrically opposed output sockets 114, 116 and 118, 120, respectively, disposed at a distance from the input hub 106, 108 along respective fastening arms 122, 124 and 126, 128.

Figure 2:
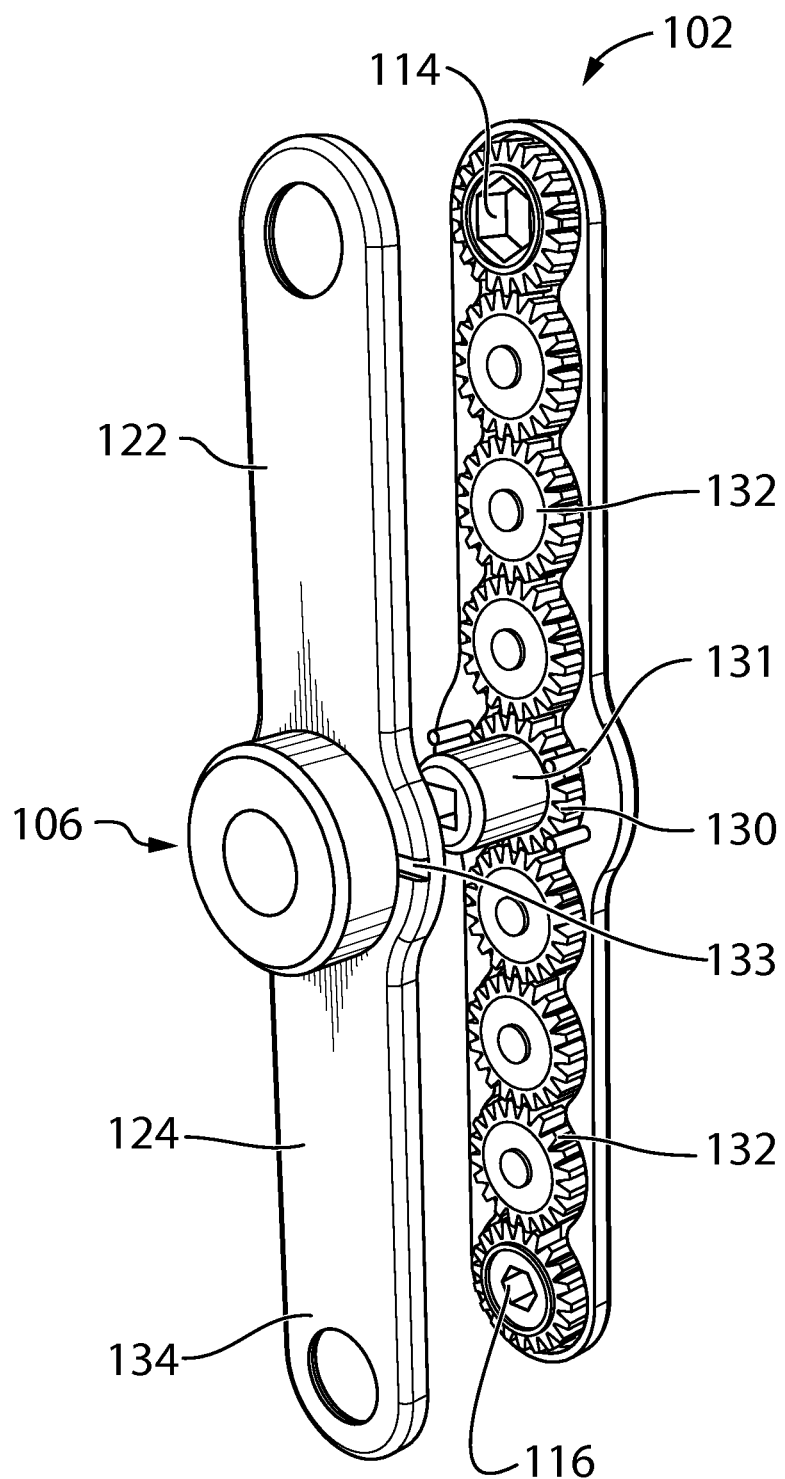
FIG. 2 is a partially exploded view of the dual offset tightening head of FIG. 1, showing an input hub thereof and fastening arms extending radially therefrom, each one of which comprising a respective output socket.

With added reference to FIG. 2, the tightening head 102 generally comprises an input gear 130 disposed within the input hub 106 for operative engagement with input drive 110, and a drive mechanism, depicted herein as a series of interoperable cog wheels 132, operatively coupling the input gear 130 to output sockets 114, 116, which in this embodiment, comprise geared rotatable sockets. As seen in FIG. 2, the hub 106 and fastening arms 122, 124 are defined by a casing 134. The input gear 130 is centrally mounted within the casing 134 (e.g. via appropriate bushings and/or bearings) for operative engagement through the hub 106 to input drive 110. Similarly, drive wheels 132 are each sequentially and rotatably mounted along each arm 122, 124 in cooperative engagement with the input gear 130 and each geared socket 114, 116 to transfer torque applied at the input gear 130 by the input drive 110 to the sockets 114, 116 in fastening an associated fastener (not shown). Other drive mechanisms for operatively coupling the input drive to the output sockets may also be considered herein without departing from the general scope and nature of the present disclosure. For example, different types of gear assemblies, wheels, belts, ratchets and the like may be considered, as will be readily appreciated by the skilled artisan, to achieve a similar result.

In this embodiment, each output socket 114, 116 is configured for cooperative engagement with a differently sized hex-type fastener, wherein selection of a given output socket, as will be described further below, allows for the same input drive 110 to act upon different fastener types without modifying the fastening device. As noted above, it will be appreciated that while hex-type fasteners are considered in this example, the device 100 can be readily adapted for other types of fasteners by reconfiguring the output sockets, either integrally, for example during manufacture of the device, or via one or more socket extensions (e.g. intermediary couplers), as shown for example in FIG. 3.

Figure 3:
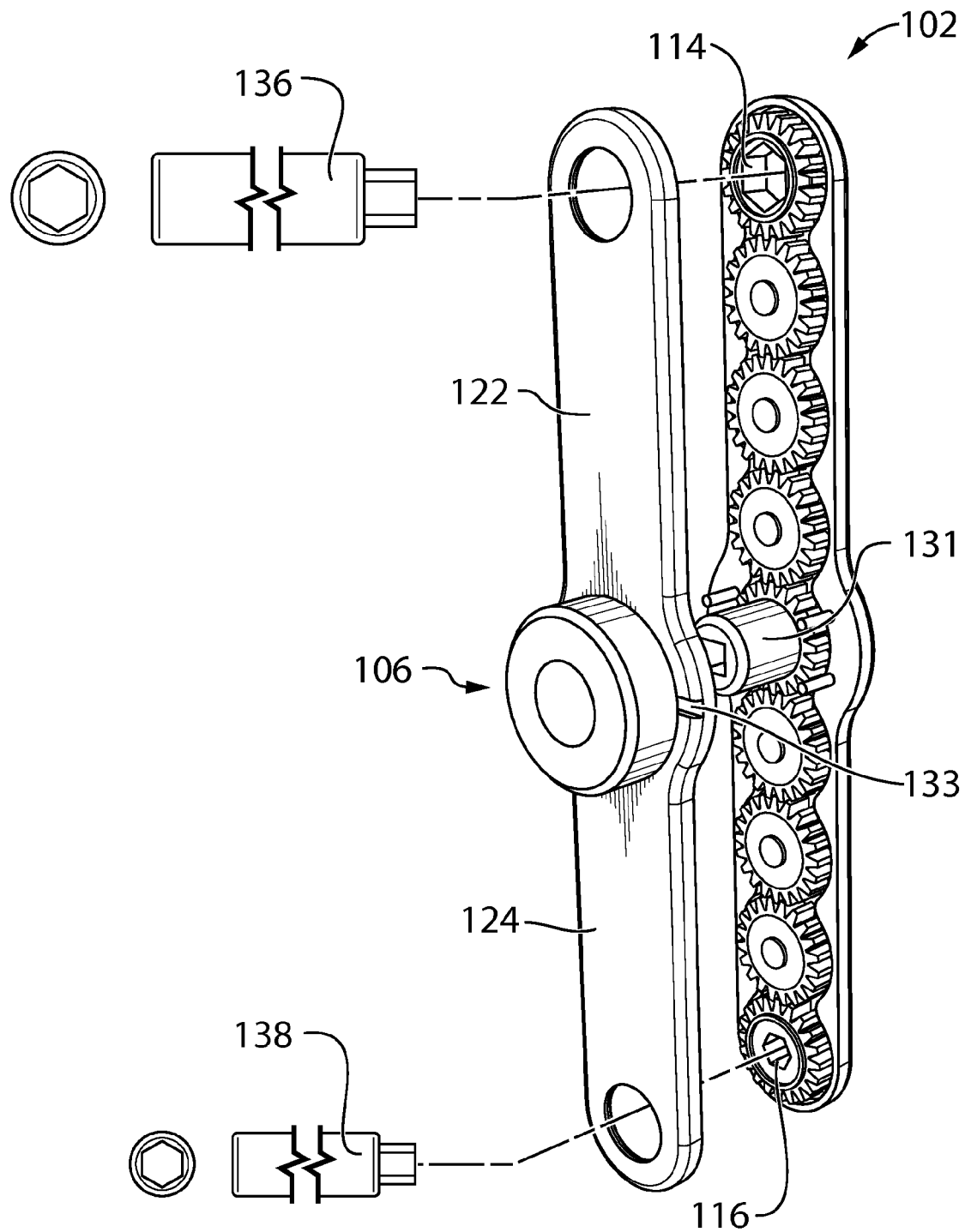
FIG. 3 is an alternative partially exploded view of the dual offset tightening head of FIG. 2, wherein each output socket is fitted with a respective output extension.
Figures 7A, 7B:
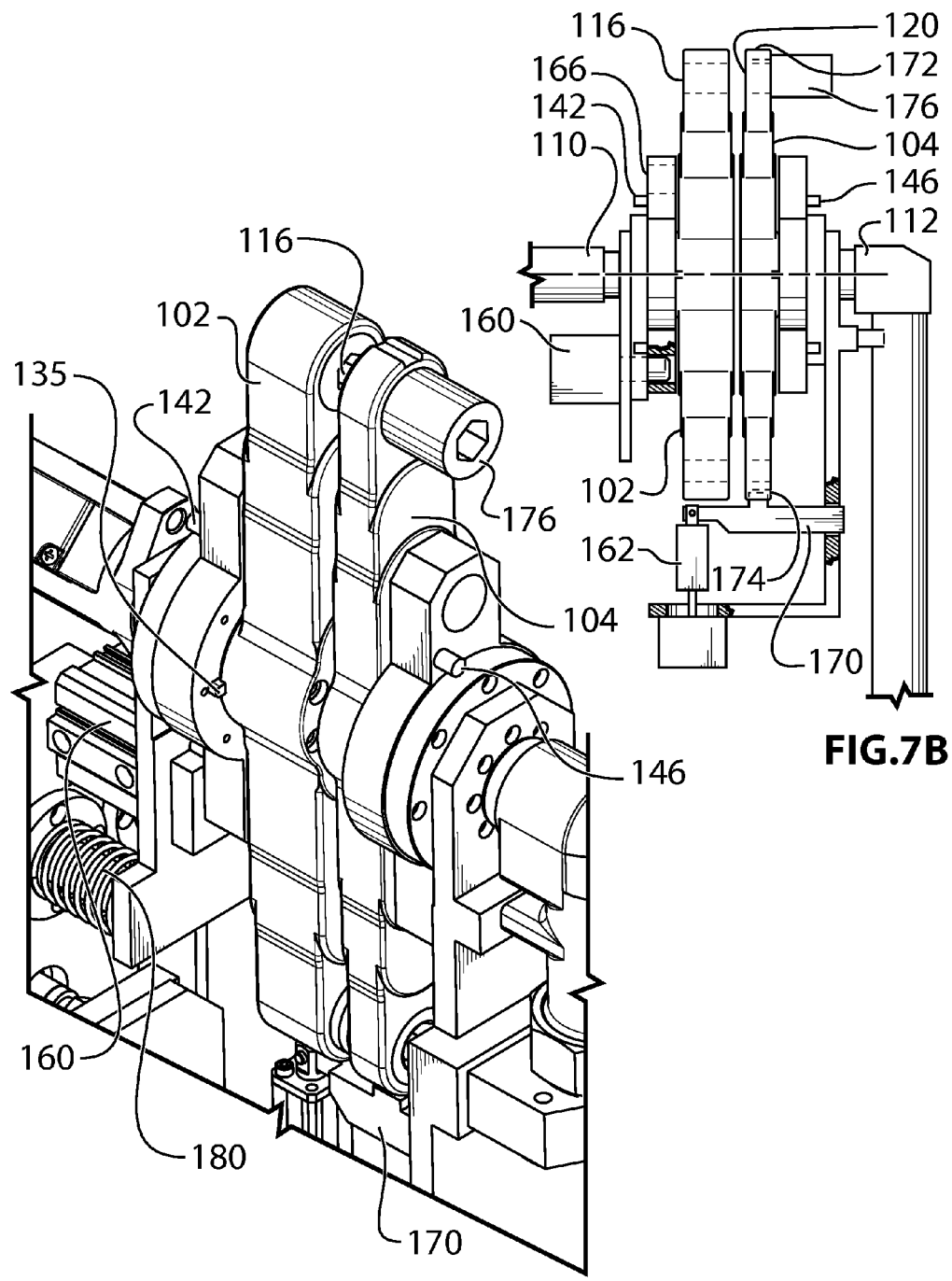
FIGS. 7A and 7B are perspective and rear elevation views, respectively, of the fastening device of FIG. 1, wherein the tightening and adjuster heads are brought closer together and wherein a selected adjuster output socket is fitted with a socket extension.

Namely, FIG. 3 depicts a modified version of the tightening head 102, wherein each output socket 114, 116 is fitted with a respective socket extension 136, 138. In this particular embodiment, the extensions 136, 138 provide for a change in output socket size, while retaining the original hex-shape of the integral output sockets 114, 116. For example, socket extensions may allow for a change in socket diameter, e.g. to accommodate smaller or larger fastener heads and/or fasteners complying with metric vs. imperial standards, or again accommodate different reach or depth requirements imposed by the fastener and/or the location at which the fastener is to be installed. For example, an extension may be required to reach into a hard-to-reach area, or again to accommodate a length/depth of the fastener or fastener head during fastening. Other types of socket extensions may include conversion tools for converting an original output socket shape to another shape (e.g. from hex to square, etc.), or again in adapting a socket to operate on different types of fastener heads (e.g. flat/slot, cross/Phillips, square/Robertson, hex, etc.), such as noted above. Furthermore, while socket extensions shown in FIG. 3 project generally outwardly toward opposing adjuster head 104, concentric extensions that reduce a diameter of the socket while remaining substantially coplanar with the original socket may also be considered, as can socket extensions projecting rearwardly, for example as shown in FIGS. 7A and 7B (e.g. to accommodate fastener/head lengths/depths, etc.). Other variations should be readily apparent to the person of ordinary skill in the art and are thus meant to fall within the scope of the present disclosure.

With reference to FIG. 1, the adjuster head 104 is generally provided in providing cooperative engagement of a fastener to or with which the fastener being tightened by the tightening head 102 is being fastened. For example, where the tightening head 102 is provided for fastening a bolt via tightening against a cooperative nut, the adjuster head 104 may be cooperatively positioned to hold the nut in place during tightening. Accordingly, in the simplest configuration, the adjuster head 104 need not be driven to fulfill its purpose of counteracting the tightening action of the tightening head 102. However, it is also contemplated that the adjuster head 104 may be driven, for example as depicted in FIGS. 2 and 3 within the context of tightening head 102, such that activation of input drive 112 imparts a fastening action to the output sockets 118, 120 of adjuster head 104. It will also be appreciated that various socket extensions, as described above, may also be provided in adapting the output sockets 118, 120 of adjuster head 104 without departing from the general scope and nature of the present disclosure.

Figure 6:
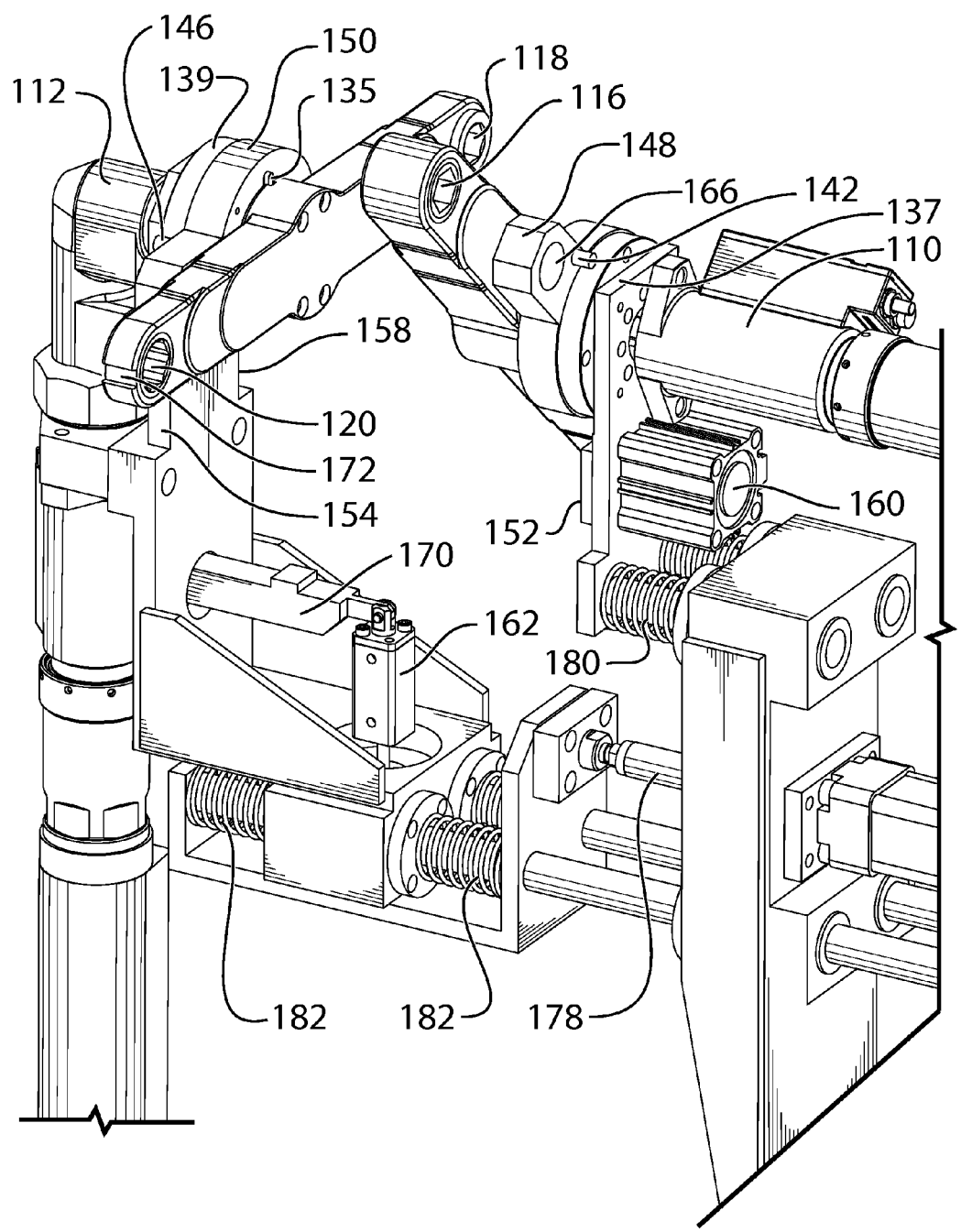
FIG. 6 is a perspective view of the fastening device of FIG. 1 during reorientation.

With reference to FIGS. 1, 2 and 6, each offset head is mounted to a respective mounting structure 148, 150 that can provide, as will be described below, various blocking mechanisms useable in selecting a working orientation of the device. In this embodiment, each mounting structure 148, 150 defines an input aperture for cooperative engagement with the input hub 106. For example, the aperture may define a deep counterbore and shoulder (not shown) to fittingly receive the input hub 106, which may consist of a needle bearing 131 or the like supported by the counterbore for engagement therethrough of the input drive 110 to the input gear 130.

A keyway 133 may also be provided in both the input hub 106 and mounting structure 148 to identify and secure proper orientation of the head 102 relative to the mounting bracket 148 via a cooperating key 135, which may be of particular relevance in aligning blocking mechanisms provided via the mounting structure(s) in guiding orientation of the device for operation. The keyway 133 and cooperating key 135 can also be used to transmit torque from the nut runner to the socket being used. In one embodiment, the mounting brackets 148, 150 are then respectively mounted to the outer race of a cross roller bearing (not shown), for example, whereas the inner race of the bearing is attached to a second bracket (e.g. structures 137, 139) that also provides a fixed mount for the input drives 110, 112, thus allowing for rotation of the tightening and adjuster heads relative to their respective input drives.

Figure 4:
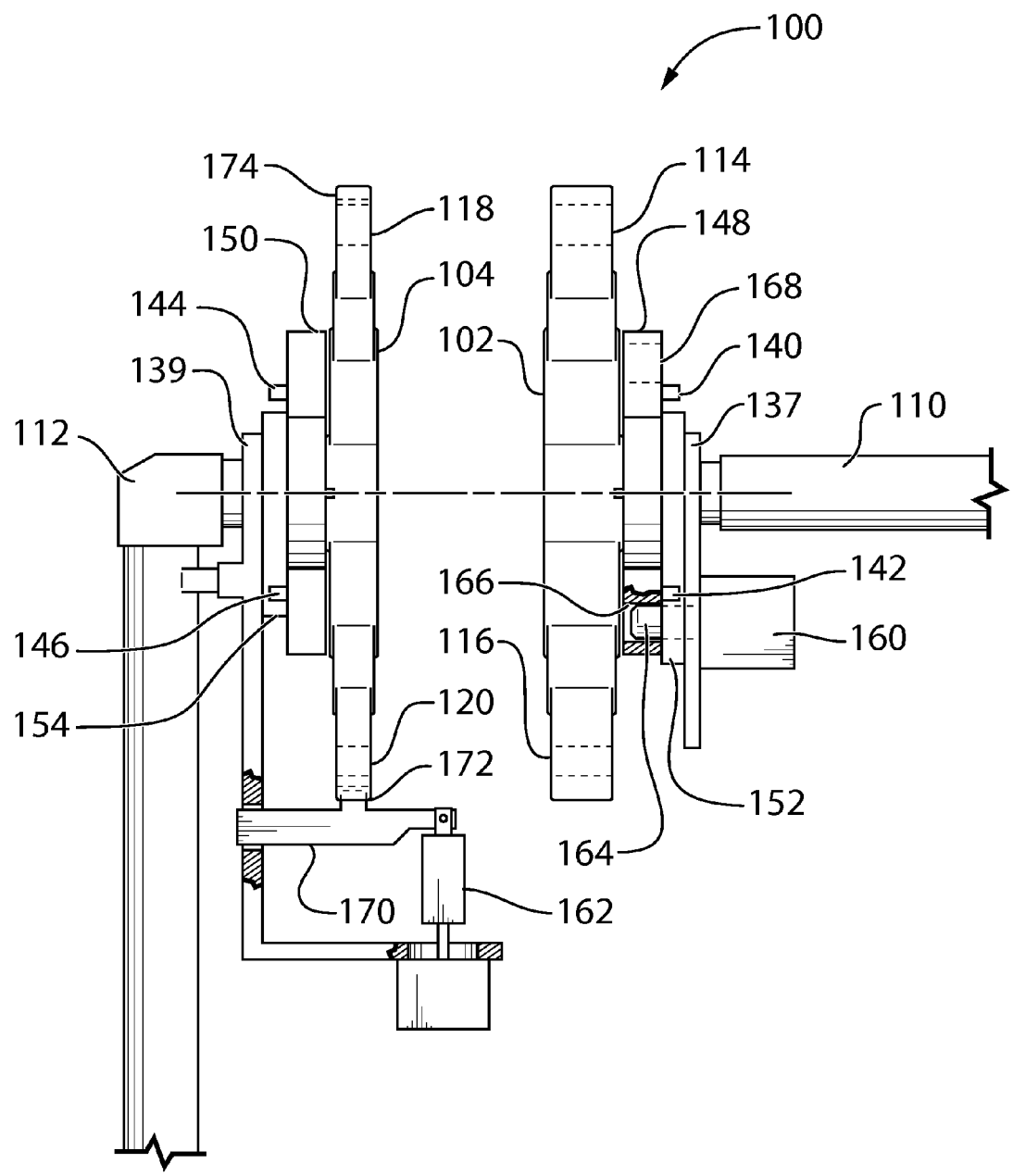
FIG. 4 is a simplified front elevation view of the fastening device of FIG. 1, showing in partial cutaway respective locking mechanisms for the tightening and adjuster heads.
Figure 5:
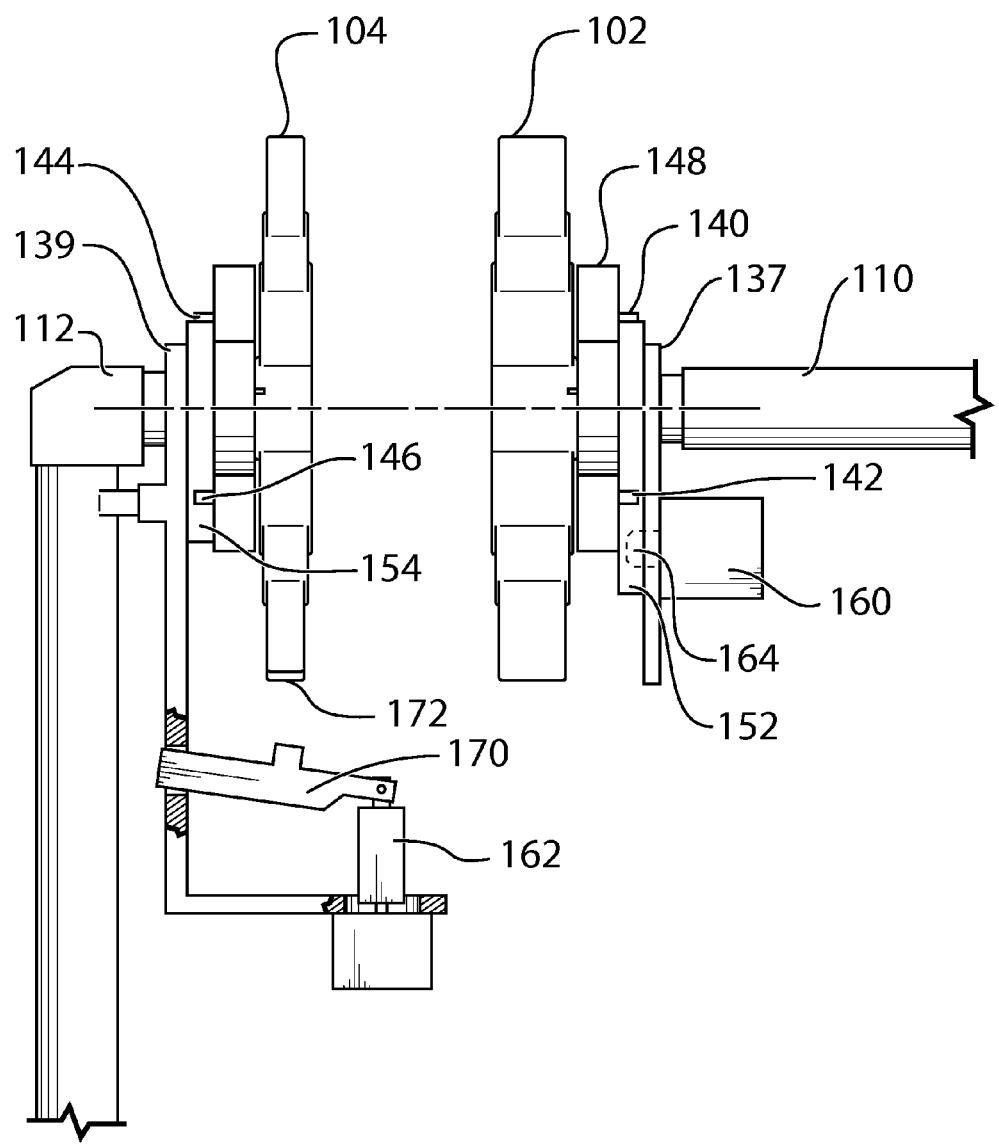
FIG. 5 is a simplified front elevation view of the fastening device of FIG. 4 during reorientation.

With particular reference to FIGS. 4, 5 and 6, upon activating the input drive 110, inherent resistance in the tightening head's drive mechanism will result in a rotation of the tightening head 102, thus allowing for the input drive 110 not only to drive the tightening head's output sockets 114, 116 but also to impart a reorientation of the device 102 in selecting a desired output socket for operation. Similarly, in an embodiment comprising a static adjuster head, the input drive 112, may be used to directly reorient the adjuster head, whereas in an embodiment comprising a geared or otherwise driven adjuster head, the input drive 112 may be used to both drive the output sockets 118, 120 and reorient the adjuster head 104 for selecting a desired output socket for operation.

In order to block the apparatus in the selected orientation, one or more blocking mechanisms are therefore provided. In this embodiment, a first blocking mechanism consists of hard stoppers 140, 142 and 144, 146 respectively disposed and positioned on mounting brackets 148, 150 of the fastening and adjuster heads 102, 104, respectively. It will be appreciated that similar stoppers may also or alternatively be positioned directly on the offset heads, or again fixedly positioned relative to the input drive to abut against a structure of the offset heads, without departing from the general scope of the present disclosure.

As seen in FIG. 4, stoppers 142 and 146 abut against respective structures 152, 154 fixedly disposed relative to input drives 110 and 112, thus blocking further reorientation of the device upon reaching a selected orientation that positions output sockets 114 and 118 for operation. Similarly, upon reversing the drive direction of input drives 110 and 112, both the tightening and adjuster heads 102, 104 will be reoriented (as shown in FIGS. 5 and 6 in different stages of reorientation), until abutment of stoppers 140, 144 on the rear-facing surface (e.g. surface 158 of FIG. 6) of these same structures, thus orienting the device for operation of output sockets 116 and 120. While the provision of hard stoppers as shown in this example may suffice in some embodiments, it will be noted that in this particular embodiment, the stoppers would only restrict reorientation in a single drive direction for each socket orientation. The device would thus have to rely on cooperative engagement with the fasteners to be fastened to restrict reorientation when the input drive is driven in an opposite drive direction.

Therefore, and in accordance with one embodiment, a further blocking mechanism consisting of respective locking mechanisms 160, 162 are provided for each of the tightening and adjuster heads 102, 104. For instance, in this example, locking mechanism 160 consists of a deployable button, nub or other such structure 164 fixedly disposed relative to the input drive 110 and configured to cooperate, when deployed, with respective locking indentations 166, 168 axially defined within, and diametrically disposed about an input aperture (not explicitly shown) of, mounting bracket 148. Accordingly, upon rotating the tightening head 102 via activation of the input drive 110 until abutment of stopper 142 against structure 152, and upon activating the locking mechanism 160 at that point to engage the deployable button or nub 164 within indentation 166, the orientation of the tightening head 102 is secured for operating output socket 114. Upon releasing the locking mechanism 160 and reversing the input drive 110, the tightening head 102 may be reoriented for operating output socket 116.

Similarly, locking mechanism 162 consists of a deployable piston-actuated lever 170 fixedly disposed relative to input drive 112 and positioned to engage, when deployed, a corresponding indentation or slot 172, 174 respectively radially defined within the extremities or distal ends of adjuster head 104. Accordingly, the orientation of adjuster head 104 can be secured in one of two orientations for facilitating operation of either of output sockets 118 and 120.

It will be appreciated that the above-proposed locking mechanisms may be interchanged or again that other locking mechanism readily known in the art may be used in addition or as an alternative to the above mechanisms in providing a similar effect, which permutations are thus considered to fall within the scope of the present disclosure.

FIGS. 7A and 7B provide an alternate view of the device 100, in this embodiment, oriented so as to operate socket 116 and 120, with socket 120 fitted with a rearward extending socket extension 176. The device 100 is also shown in this figure in a tighter configuration, whereby adjuster head 104 is brought closer to tightening head 102, for example via electromechanical cylinder 178 shown in FIGS. 1 and 6, which in this illustrative embodiment, is capable of changing the distance between the heads 104 and 102 to any value within the stroke limits of the actuator (e.g. 200 mm in this particular embodiment). In these figures, spring compliance mechanisms 180, 182 are also provided for each of the tightening head 102 and adjuster head 104, respectively.

In one embodiment, the device described herein provides two or more geared offset heads, otherwise known as a crows foot, used for tightening applications requiring restricted access to a bolt head or the like, wherein the device can be automatically reconfigured to more than one size of hex bolt head via reorientation of the device, such as via rotation of the offset heads upon activation of the input drive (e.g. a powered nut runner or the like). Accordingly, the geared offset head need not be replaced for another assembly in attending to different fastener types, which, in an automated assembly application, requires manual intervention and thus results in system downtime. The use of multiple specifically configured input drives (nut runners), common in current automated assembly applications, is also avoided, thus reducing equipment costs and resulting in a more compact tooling design.

Furthermore, it will appreciated that other embodiments may be considered herein where a given fastening device (e.g. tightening head and/or adjuster head) comprises more than two output sockets, for example disposed upon three or more driven fastening arms extending radially from a commonly driven input hub. In such embodiments, reorientation of the device may still be implemented by action of the input drive upon the fastening device's drive mechanism, thus allowing for selection of a particular output socket from a set of available sockets on a same multiple offset head.

Also, while the embodiment depicted herein contemplates the provision of fastening arms of equal lengths, a similar device may be designed within the present context to provide different fastening arm lengths and thus not only for the selection of a given output socket, but also or alternatively, selection of a given output socket reach.

These and other advantages of the above described and other related embodiments will be readily apparent to the person of ordinary skill in the art, as will alternative apparatus shapes, sizes, structures, materials, manufactures and component couplings, which alternatives are thus considered to fall within the general scope and nature of the present disclosure.

While the present disclosure describes various exemplary embodiments, the disclosure is not so limited. To the contrary, the disclosure is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An apparatus for use with an input drive in fastening threaded fasteners of different types, comprising:
   an input hub for operative engagement with the input drive;
   two opposed fastening arms extending radially outwardly from and fixed relative to said input hub, each fastening arm comprising a fastening output socket rotatably mounted at a distance from said input hub for cooperative engagement with threaded fasteners of a respective type, and a drive mechanism for operatively coupling said fastening output socket to said input drive via said input hub such that, upon engagement with said input hub, activation of said input drive reorients the apparatus by rotating the fastening arms relative to the input hub; and
   a blocking mechanism configured to block the continued rotation of the fastening arms at a selected orientation for one of the fastening arms to operate a corresponding fastening output socket,
   wherein said blocking mechanism comprises a locking mechanism to lock the apparatus in said selected orientation, and said locking mechanism includes one or more structural indentations fixedly disposed relative to said fastening arms for mating engagement with one or more corresponding deployable structures fixedly disposed relative to the input drive.

2. The apparatus of claim 1, wherein at least one of said structural indentations is radially defined within a distal end of a given one of said arms.

3. The apparatus of claim 1, wherein at least one of said structural indentations is axially defined relative to said input hub.

4. The apparatus of claim 3, further comprising a mounting structure fixedly disposed about said input hub, at least one of said structural indentations being axially defined within said mounting structure.

5. The apparatus of claim 1, wherein said input hub and said fastening arms define a casing in which are operatively encased said drive mechanism and a hub input gear for operative engagement with the input drive to drive each said fastening socket via said drive mechanism.

6. An apparatus for use with an input drive in fastening threaded fasteners of different types, comprising:
   an input hub for operative engagement with the input drive;
   two opposed fastening arms extending radially outwardly from and fixed relative to said input hub, each fastening arm comprising a fastening output socket rotatably mounted at a distance from said input hub for cooperative engagement with threaded fasteners of a respective type, and a drive mechanism for operatively coupling said fastening output socket to said input drive via said input hub such that, upon engagement with said input hub, activation of said input drive reorients the apparatus by rotating the fastening arms relative to the input hub; and
   a blocking mechanism configured to block the continued rotation of the fastening arms at a selected orientation for one of the fastening arms to operate a corresponding fastening output socket,
   wherein said input hub and said fastening arms define a casing in which are operatively encased said drive mechanism and a hub input gear for operative engagement with the input drive to drive each said fastening socket via said drive mechanism, and wherein said blocking mechanism comprises one or more structural indentations in said casing for mating engagement with one or more corresponding deployable structures fixedly disposed relative to the input drive.

7. The apparatus of claim 6, wherein at least one of said structural indentations is radially defined within a distal end of said casing.

8. The apparatus of claim 6, further comprising a mounting structure fixedly mounted to said casing and defining an input aperture for allowing operative engagement of the input drive with said hub input gear therethrough, said mounting structure having one or more structural indentations axially defined therein relative to and radially distanced from said input aperture for mating engagement with one or more corresponding deployable structures fixedly disposed relative to the input drive.

9. The apparatus of claim 6, wherein the two fastening arms are diametrically opposed.

10. The apparatus of claim 6, wherein a selected one of said fastening sockets is provided for engagement with a first fastener type, and the apparatus further comprises an adjuster for cooperative positioning relative to said selected one of said fastening sockets for engaging a second fastener type cooperative with said first fastener type to be fastened to one another.

11. An apparatus for use with an input drive in fastening threaded fasteners of different types, comprising:
an input hub for operative engagement with the input drive;
two opposed fastening arms extending radially outwardly from and fixed relative to said input hub, each fastening arm comprising a fastening output socket rotatably mounted at a distance from said input hub for cooperative engagement with threaded fasteners of a respective type, and a drive mechanism for operatively coupling said fastening output socket to said input drive via said input hub such that, upon engagement with said input hub, activation of said input drive reorients the apparatus by rotating the fastening arms relative to the input hub; and
a blocking mechanism configured to block the continued rotation of the fastening arms at a selected orientation for one of the fastening arms to operate a corresponding fastening output socket,
wherein a selected one of said fastening sockets is provided for engagement with a first fastener type, and the apparatus further comprises an adjuster for cooperative positioning relative to said selected one of said fastening sockets for engaging a second fastener type cooperative with said first fastener type to be fastened to one another, and wherein said adjuster comprises:
a second input hub for operative engagement with a second input drive;
two or more adjusting arms extending radially from said second input hub, each adjusting arm comprising an adjuster socket mounted at a distance from said second input hub for cooperative engagement with a respective second fastener type when cooperatively positioned relative to a selected one of said fastening sockets, such that, upon engagement with said second input hub, activation of said second input drive reorients said adjuster; and
a second blocking mechanism configured to block said adjuster in a selected orientation for operating a selected one of said adjuster sockets.

12. The apparatus of claim 11, wherein one of said first fastener and said second fastener comprises a bolt, and wherein the other of said first fastener and said second fastener comprises a nut.

13. The apparatus of claim 11, wherein each of said adjusting arms further comprises a respective drive mechanism for operatively coupling said adjuster socket to said second input drive via said second input hub.

14. The apparatus of claim 11, wherein each said adjuster socket is fixedly mounted to position and hold said second fastener type relative to said first fastener type.

15. A geared offset head for use with an input drive in fastening threaded fasteners of different types, comprising:
a body defining an input hub and two offset heads extending therefrom;
an input gear operatively mounted at said hub for operative engagement with the input drive;
a respective output socket operatively mounted at each of said offset heads;
a drive mechanism operatively coupling each said respective output socket to said input gear; and
one or more structural features for blocking reorientation of the geared offset head during operation of a selected one of said offset heads;
wherein, upon engagement with said input gear, activation of said input drive reorients the apparatus until engagement of said one or more structural features, thereby allowing operation of a selected output socket, wherein said one or more structural features comprises one or more structural indentations shaped and disposed in said body for mating engagement with one or more corresponding deployable structures to be fixedly disposed relative to the input drive.

16. The geared offset head of claim 15, wherein said structural indentations comprise radially defined indentations within each of said offset heads.

17. A geared offset head for use with an input drive in fastening threaded fasteners of different types, comprising:
a body defining an input hub and two opposed offset heads extending therefrom;
an input gear operatively mounted at said hub for operative engagement with the input drive;
a respective output socket operatively mounted at each of said offset heads;
a drive mechanism operatively coupling each said respective output socket to said input gear; and
one or more structural features for blocking reorientation of the geared offset head during operation of a selected one of said offset heads;
wherein, upon engagement with said input gear, activation of said input drive reorients the apparatus until engagement of said one or more structural features, thereby allowing operation of a selected output socket;
further comprising a mounting structure fixedly coupled to said body and defining an input aperture for allowing operative engagement of the input drive with said input gear therethrough, said one or more structural features comprising one or more structural indentations shaped and disposed in said mounting structure for mating engagement with one or more corresponding deployable structures to be fixedly disposed relative to the input drive.

18. The geared offset head of claim 17, wherein said one or more structural indentations comprise one or more axially defined indentations radially distanced from said input aperture.

* * * * *